(12) United States Patent
Naulleau

(10) Patent No.: US 6,266,147 B1
(45) Date of Patent: Jul. 24, 2001

(54) PHASE-SHIFTING POINT DIFFRACTION INTERFEROMETER PHASE GRATING DESIGNS

(75) Inventor: Patrick Naulleau, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/419,703

(22) Filed: Oct. 14, 1999

(51) Int. Cl.⁷ .................................................. G01B 9/02
(52) U.S. Cl. ............................................ 356/515; 356/521
(58) Field of Search ................................... 356/515, 521, 356/512, 513, 514

(56) References Cited

U.S. PATENT DOCUMENTS 5,835,217 * 11/1998 Medecki ................. 356/521
6,100,978 * 8/2000 Naulleau et al. .......... 356/521

OTHER PUBLICATIONS

Naulleau, Patrick, et al. "Characterization of the accuracy of EUV phase–shifting point diffraction interferometry", *SPIE*, v. 3331 (1998) 114–123.

Anderson, Erik H., et al., "Electron beam lithography digital pattern generator and electronics for generalized curvilinear structures", *J. Vac. Sci, Technol.B*, vol. 13, No. 6. (1995) 2529–2534.

Brophy, Chris P., "Effect of intensity error correlation on the computed phase of phase–shifting interferometry", *J. Opt, Soc. Am. A* vol. 7, No. 4 (1990) 537–541.

Medecki, H., et al., "Phase–shifting point diffraction interferometer" *Optics Letters*, vol. 21, No. 19 (1996) 1526–1528.

Bjorkholm, J.E. et al., "Phase–measuring interferometry using extremee ultraviolet radiation", *AT & T Bell Laboratories, Holmdel, NJ*, 1995.

* cited by examiner

Primary Examiner—Samuel A. Turner
(74) Attorney, Agent, or Firm—Burns, Doane, Swecker & Mathis L.L.P.

(57) ABSTRACT

Diffraction phase gratings are employed in phase-shifting point diffraction interferometers to improve the interferometric fringe contrast. The diffraction phase grating diffracts a zeroth-order diffraction of light at a first power level to the test-beam window of a mask that is positioned at the image plane and a first-order diffraction at a second power to the reference-beam pinhole. The diffraction phase grating is preferably selected to yield a desired ratio of the first power level to second power level.

27 Claims, 10 Drawing Sheets

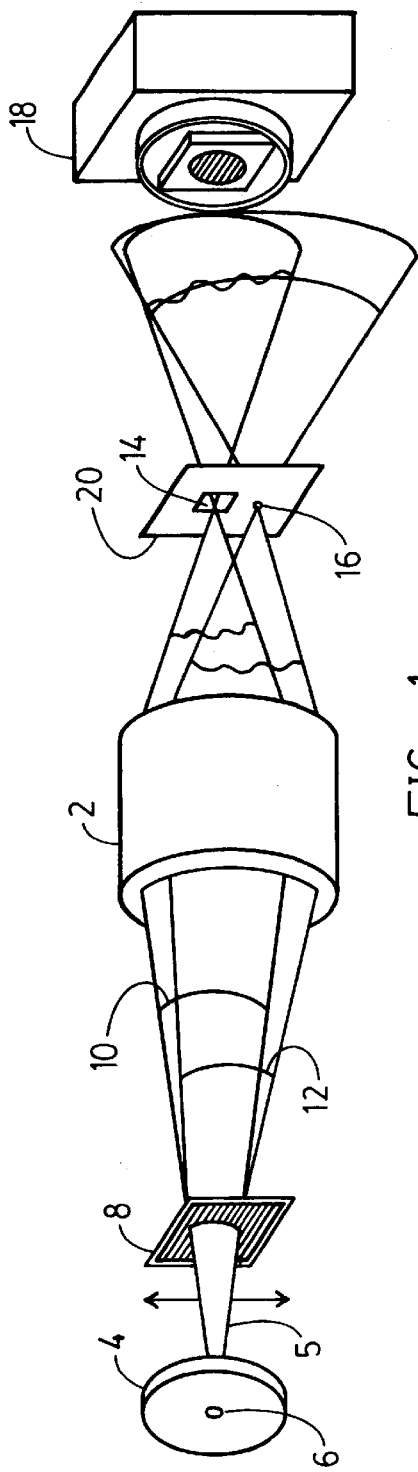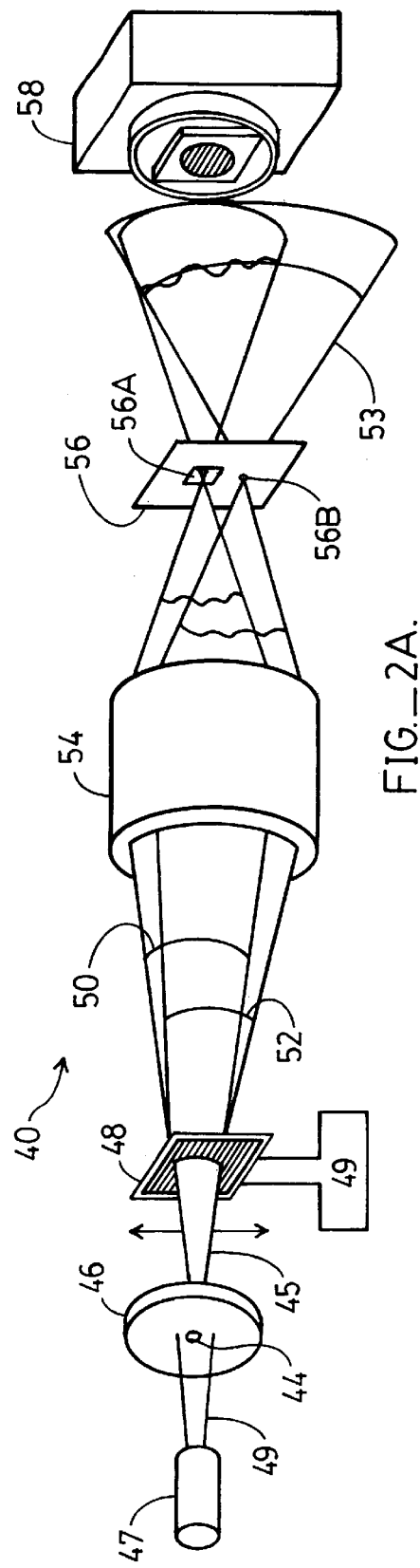

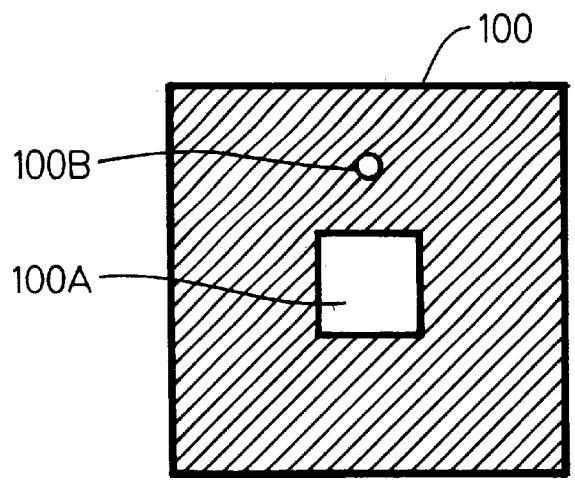
FIG._2B.
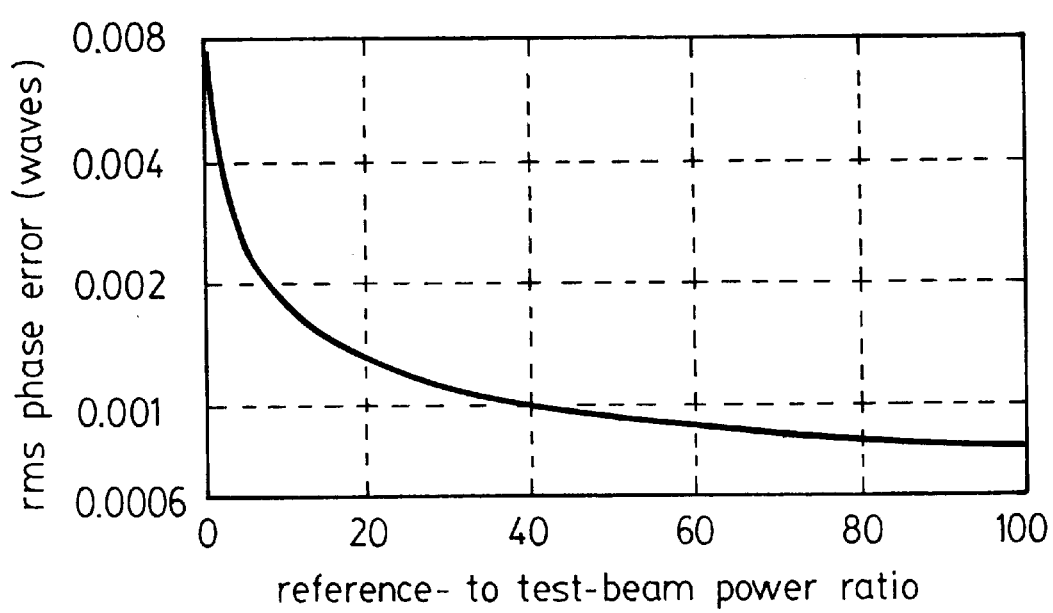
FIG._4.

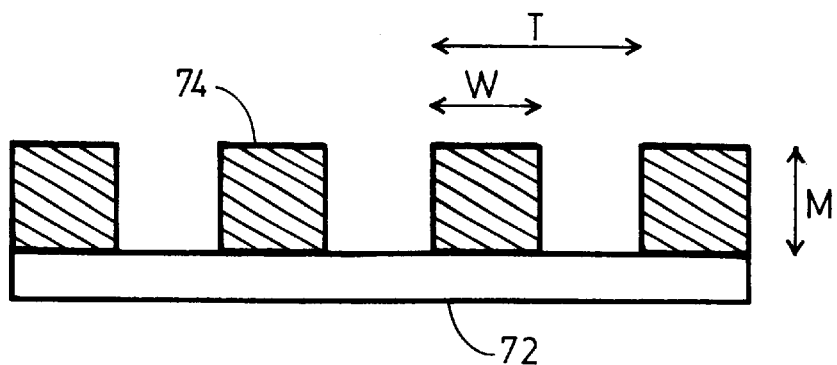
FIG._3A.
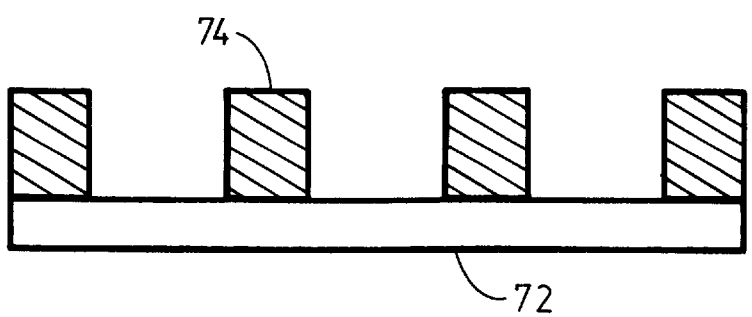
FIG._3B.
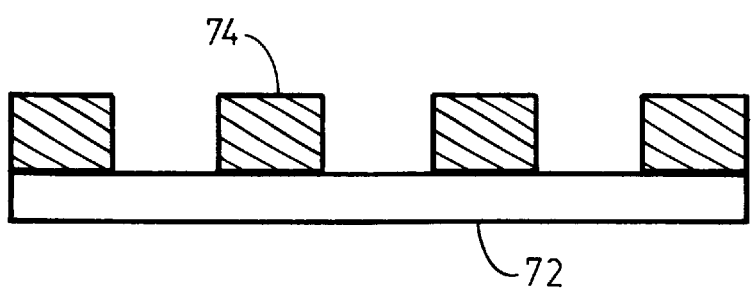
FIG._3C.

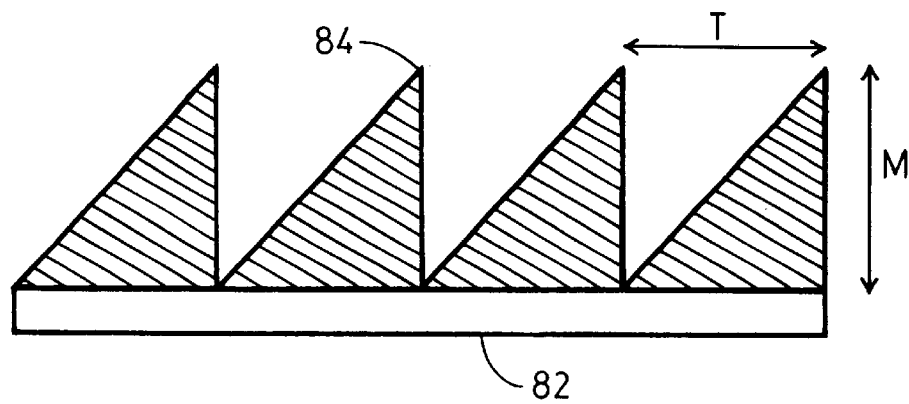
FIG._3D.
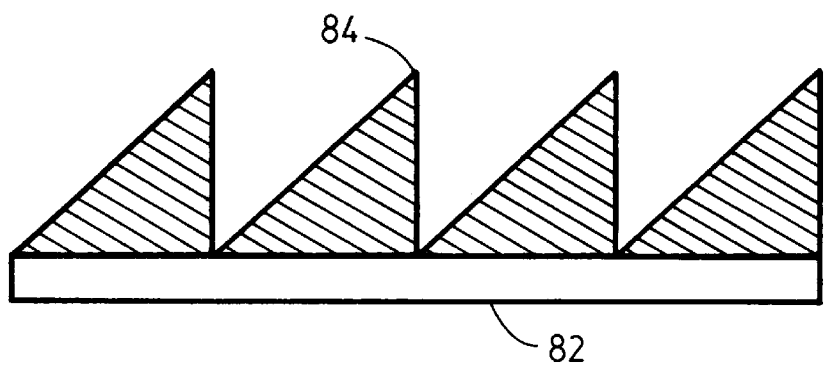
FIG._3E.
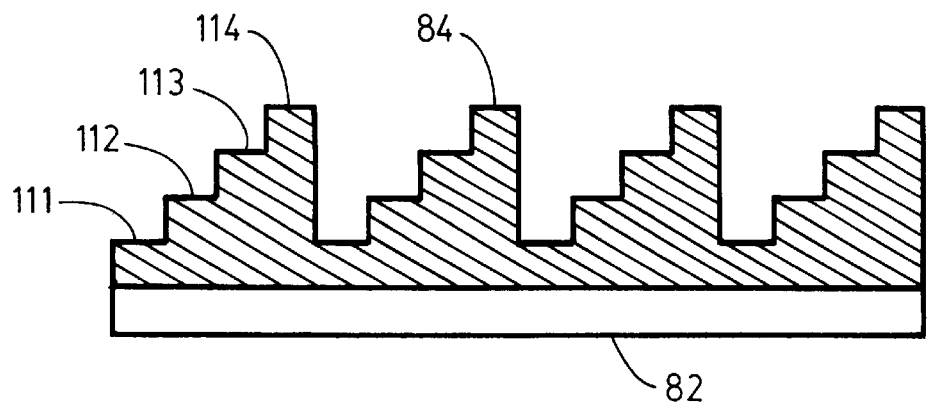
FIG._3F.

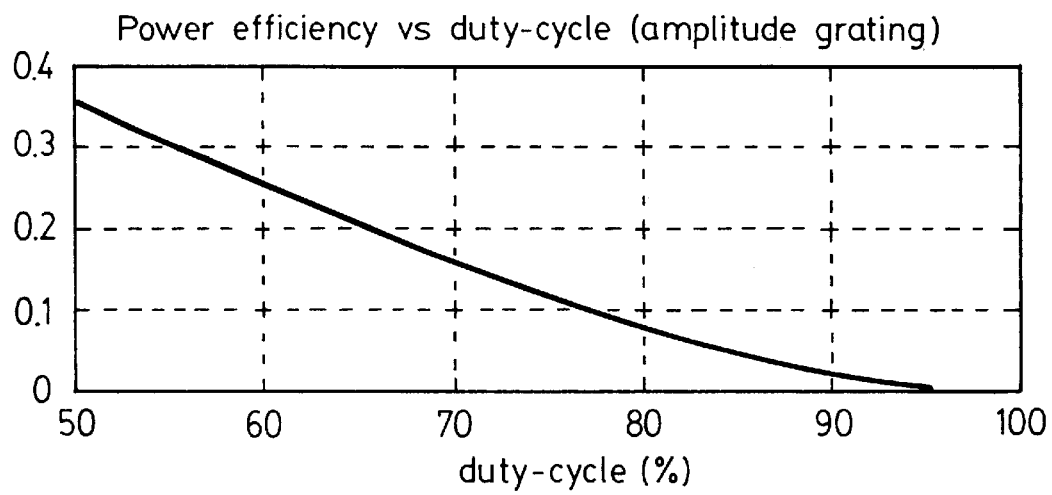
FIG._5A.
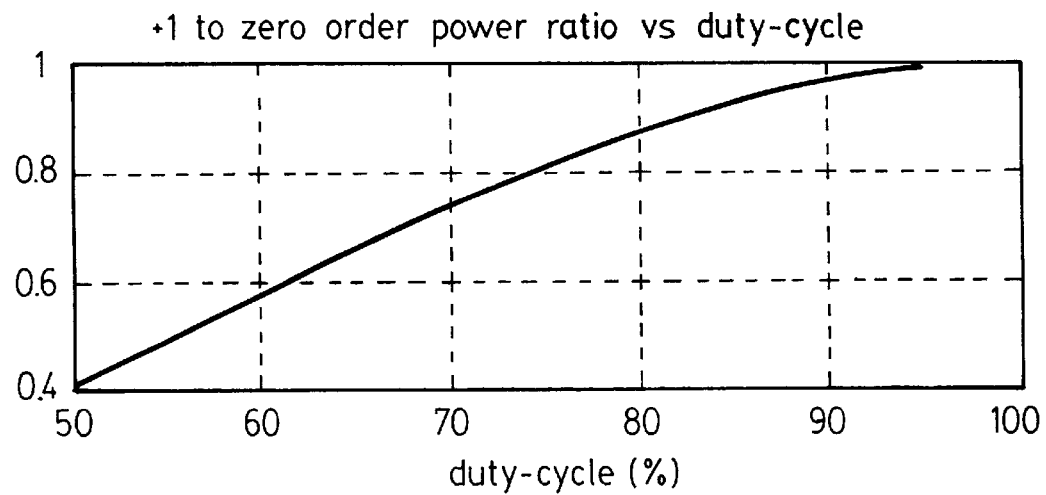
FIG._5B.

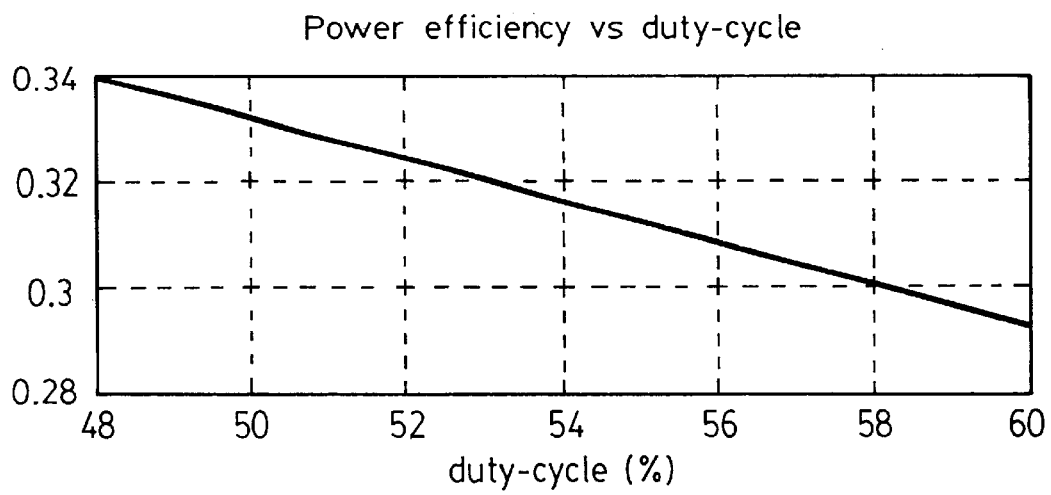
FIG._6A.
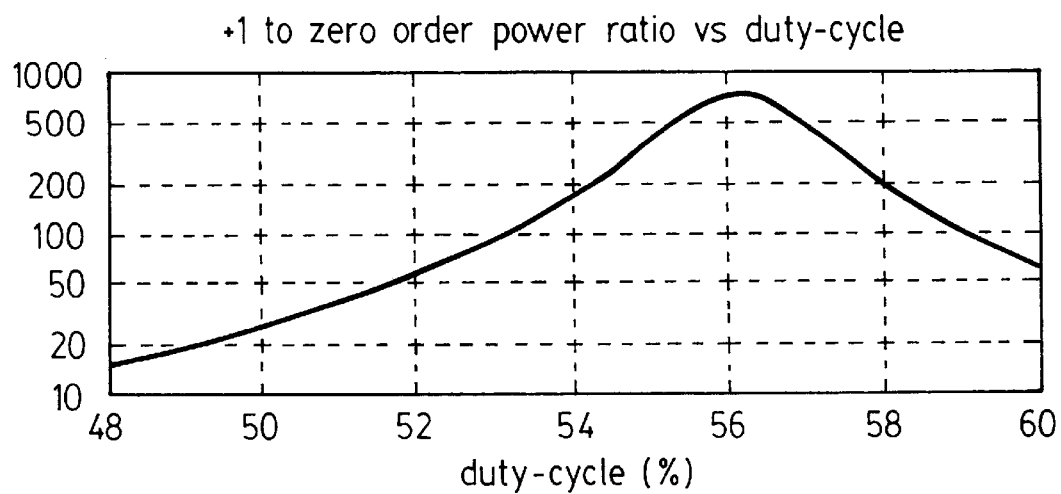
FIG._6B.

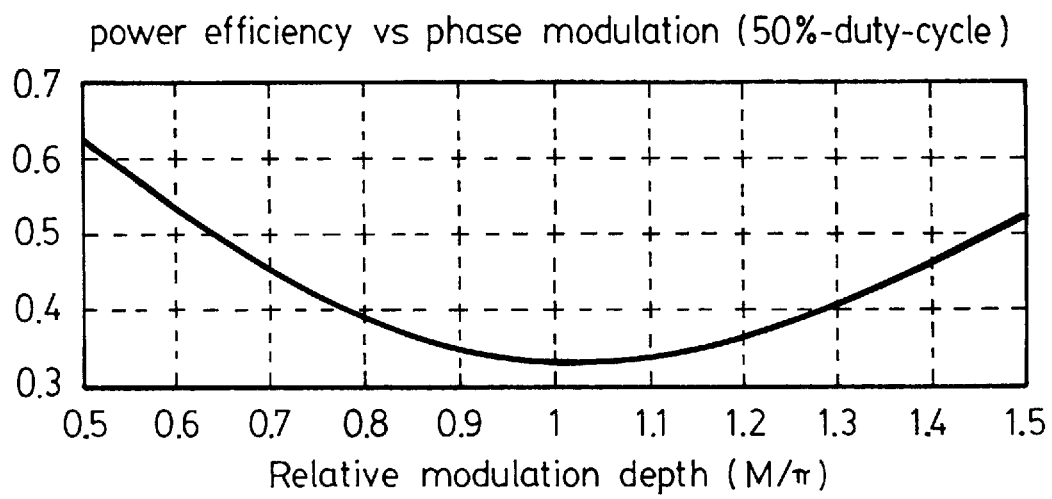
FIG._7A.
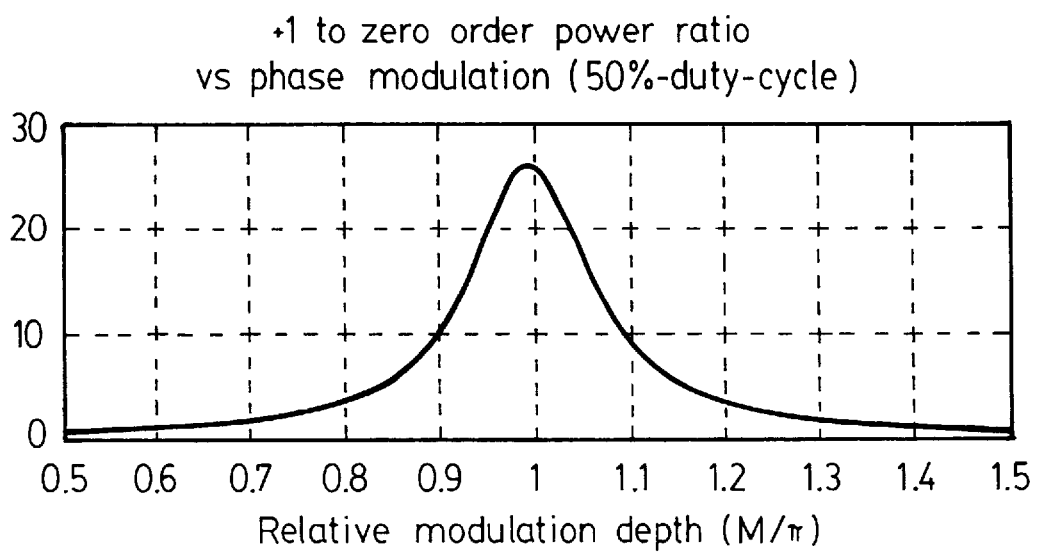
FIG._7B.

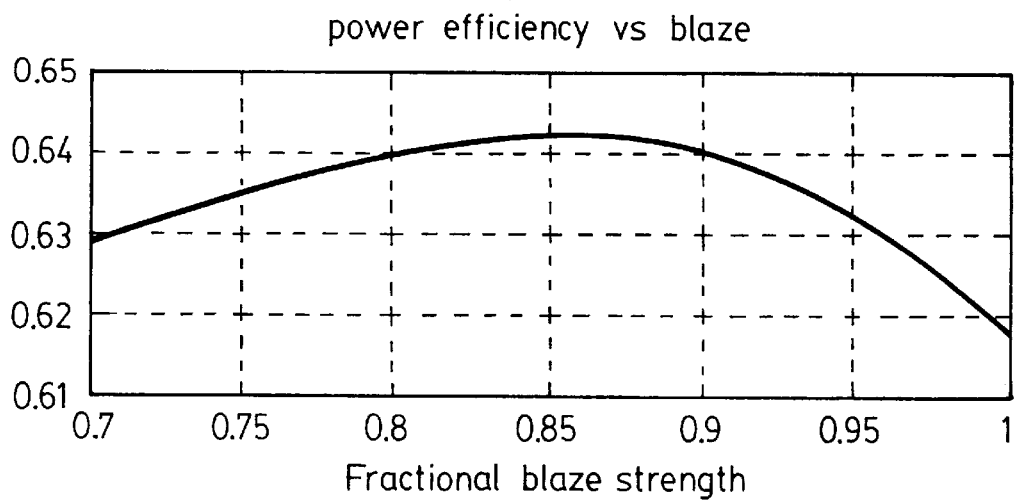
FIG._8A.
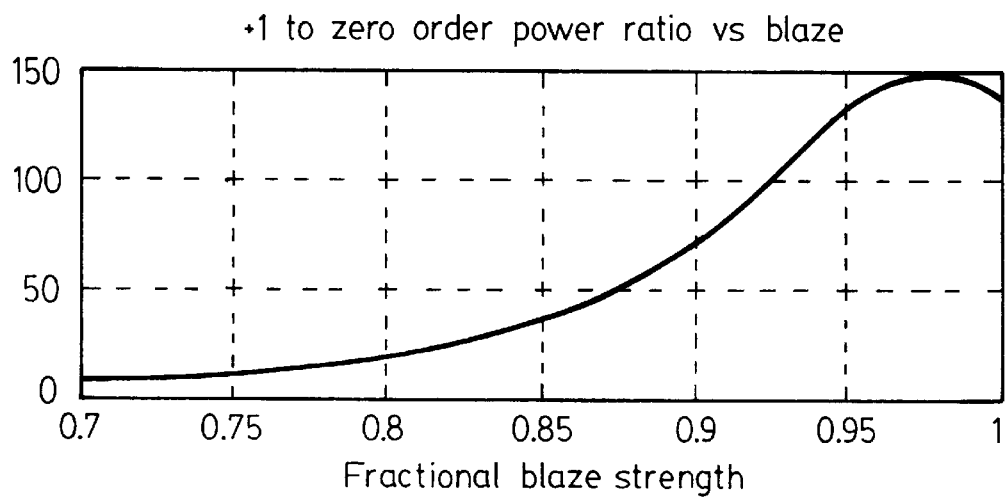
FIG._8B.

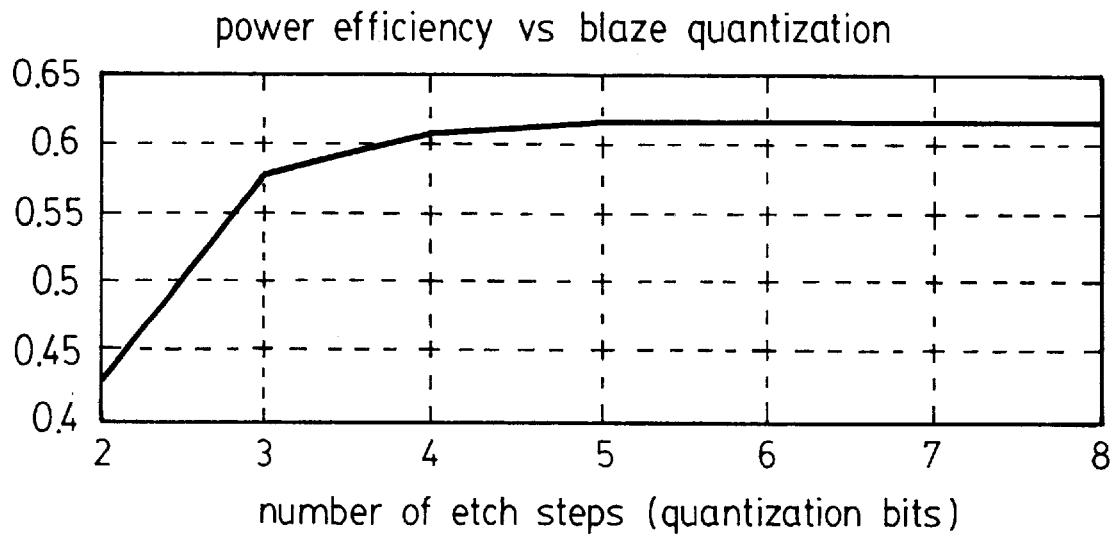
FIG._9A.
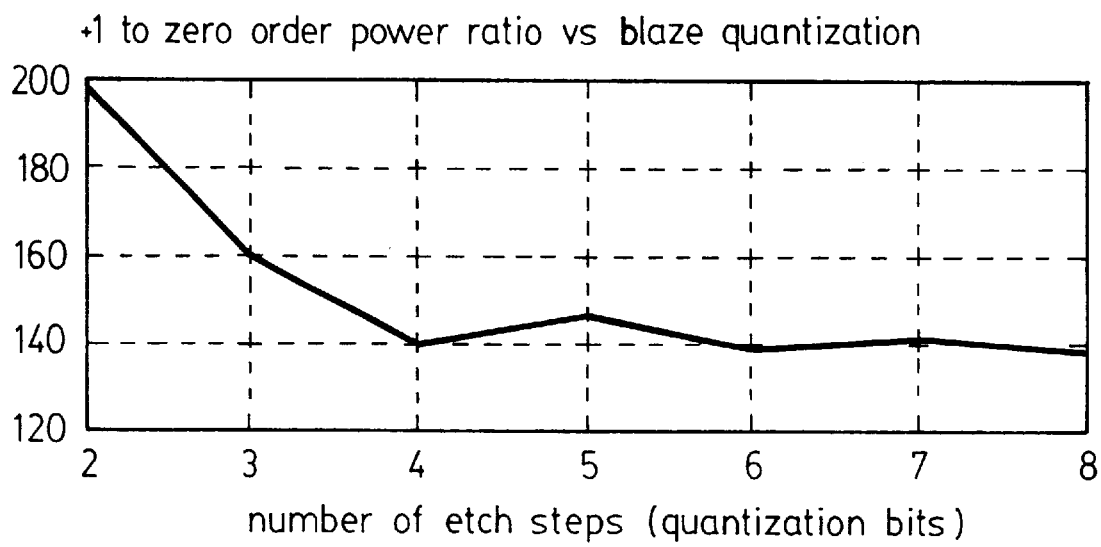
FIG._9B.

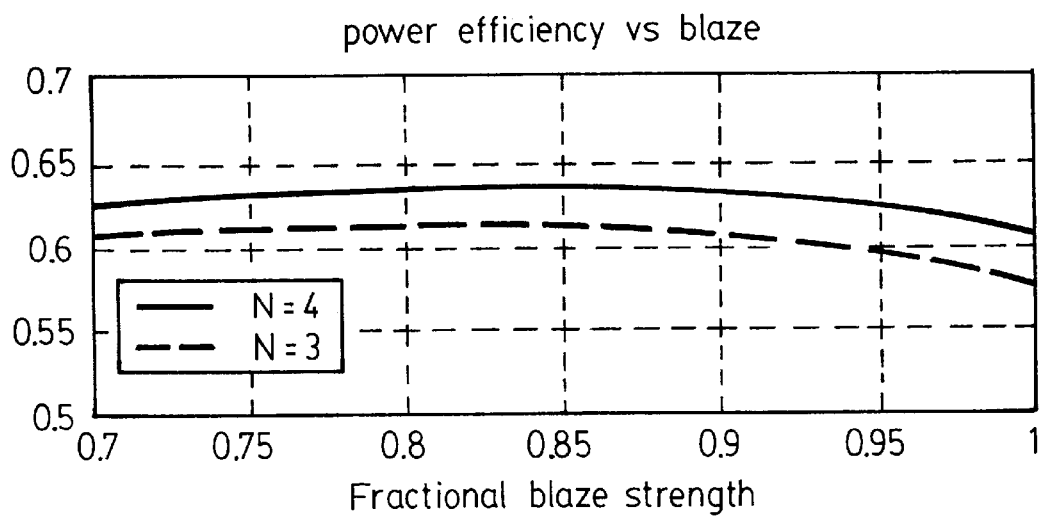
FIG._10A.
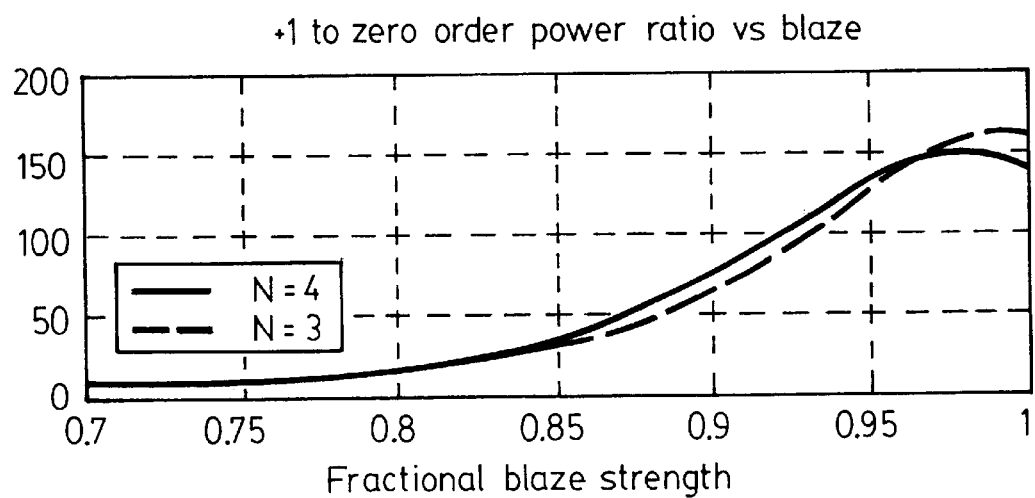
FIG._10B.

PHASE-SHIFTING POINT DIFFRACTION INTERFEROMETER PHASE GRATING DESIGNS

The U.S. Government has certain rights in this invention pursuant to Contract No. DE-AC03-76SF00098 between the United States Department of Energy and the University of California for operating Lawrence Berkeley National Laboratory.

BACKGROUND OF THE INVENTION

1. Field of the Invention

The present invention relates to interferometers for making highly accurate measurements of wave front aberrations, particularly to phase-shifting point diffraction interferometers.

2. State of the Art

Optical metrology is the study of optical measurements. An area of optical metrology relevant to the present invention is the use of an interferometer to measure the quality of a test optic, such as a mirror or a lens. One important recent application of optical metrology is the testing of projection optics for photolithography systems. Modern photolithography systems used to fabricate integrated circuits must continually image smaller features. To do so, systems are confronted with the diffraction limit of the light employed to image a pattern provided in a reticle. To meet this challenge, photolithographic systems must employ successively shorter wavelengths. Over the history of integrated circuit fabrication technology, photolithography systems have moved from visible to ultraviolet and will eventually move to even shorter wavelengths, such as extreme ultraviolet.

As with all optical imaging systems, various aberrations such as spherical aberration, astigmatism, and coma may be present. These aberrations must be identified and removed during the fabrication and/or alignment of the projection optics, or the projection optics will introduce substantial blurring in the image projected onto the wafer.

In order to test the projection optics for various aberrations, interferometers may be employed. Conventional interferometers, based upon the Michelson design, for example, employ a single coherent light source which is split into a test wave and a reference wave. The test wave passes through the optic under test and the reference wave avoids that optic. The test and reference waves are recombined to generate an interference pattern or interferogram. Analysis of the interferogram and resultant wavefront with, for example, Zernike polynomials, indicates the presence of aberrations.

The reference wave of the interferometer should be "perfect"; that is, it should be simple and well characterized, such as a plane or spherical wave. Unfortunately, beam splitters and other optical elements through which the reference beam passes introduce some deviations from perfection. Thus, the interferogram never solely represents the condition of the test optic. It always contains some artifacts from the optical elements through which the reference wave passes. While these artifacts, in theory, can be separated from the interferogram, it is usually impossible to know that a subtraction produces a truly "clean" interferogram.

To address this problem, "point diffraction interferometers" have been developed. An example of a point diffraction interferometer is the phase-shifting point diffraction interferometer (PS/PDI) described in H. Medecki, et al., "Phase-Shifting Point Diffraction Interferometer", Optics Letters, 21(19), 1526–28 (1996), E. Tejnil, et al., "At-Wavelength Interferometry for EUV Lithography, et al, J. Vacuum Science & Tech. B, 15, 2455–2461(1997), K. A. Goldberg, et al., "Characterization of an EUV Schwarzchild Objective Using Phase-Shifting Point Diffraction Interferometry," Proceeding SPIE, 3048, 264–270 (1997), E. Tejnil, et al., "Phase-Shifting Point Diffraction Interferometry for At-Wavelength Testing of Lithographic Optics," OSA Trends in Optics and Photonics: Extreme Ultraviolet Lithography, Optical Society of America, Washington, D.C., 4, 118–123 (1996), K. A. Goldberg, "Extreme Ultraviolet Interferometry," doctoral dissertation, Dept. of Physics, Univ. of California, Berkeley (1997), and in the U.S. Pat. No. 5,835,217 "Phase-Shifting Point Diffraction Interferometer," Inventor Hector Medecki, which are all incorporated herein by reference.

The PS/PDI is a variation of the conventional point diffraction interferometer in which a transmission grating has been added to greatly improve the optical throughput of the system and add phase-shifting capability. In the PS/PDI, as illustrated in FIG. 1, the optical system 2 under test is illuminated by a spherical wave 5 that is generated by an entrance pinhole 6 in a mask 4 that is placed in the object plane of the optical system 2. To assure the quality of the spherical wave illumination, pinhole 6 is chosen to be several times smaller than the resolution limit of the optical system. Grating 8 splits the illuminating beam 5 to create the required test and reference beams 10 and 12, respectively. A PS/PDI mask 20 is placed in the image plane of the optical system 2 to block the unwanted diffracted orders generated by the grating 8 and to spatially filter the reference beam 12 using a reference pinhole 16. The test beam 10, which contains the aberrations imparted by the optical system, is largely undisturbed by the image plane mask by virtue of it passing through a window 14 in the PS/PDI mask 20 that is large relative to the point-spread function of the optical system. The test and reference beams propagate to the mixing plane where they overlap to create an interference pattern recorded on a CCD detector 18. The recorded interferogram yields information on the deviation of the test beam from the reference beam which in the ideal case is a spherical wave. The PS/PDI mask typically comprises a square shaped window and a reference pinhole to the side. The light in the interferometer will typically be of a single wavelength. The grating 8 will transmit the zeroth-order beam straight through, but will produce a small angular change to the first-order diffractions. In the image plane, the zeroth-order, and the first-order diffractions will be in different positions, as indicated by the reference pinhole and the test window in the mask 20. The zeroth-order goes to the test beam window and the first-order goes to the reference pinhole. Phase-shifting is provided by translating the grating 8 perpendicular to the rulings of the grating. Phase-shifting improves the accuracy of the system.

The phase-shifting point diffraction interferometer tends to suffer from relatively low fringe contrast which makes the signal more susceptible to noise and therefore has the potential of limiting the accuracy of the interferometry. This low contrast is due to the imbalance between the zeroth-order test beam and the first-order reference beam and the imbalance is further aggravated by the spatial filtering of the reference beam. As is apparent, there is a need for improving the fringe contrast and thus the signal-to-noise ratio.

Previous endeavors to achieve test-beam balance include, for example, increasing the size of the phase-shifting point diffraction interferometer reference pinhole. This method is not acceptable because the accuracy of the phase-shifting point diffraction interferometer improves as the reference pinhole gets smaller. An alternative method for balancing the beams involves placing an attenuating membrane in the test-beam window. This method is also not acceptable because membrane damage and contamination caused by extreme ultraviolet radiation reduces the accuracy of the phase-shifting point diffraction interferometer.

More recent PS/PDI grating enhancements have improved the interferometric fringe contrast and thus the wavefront measurement accuracy of the PS/PDI. One method relies on reversing the test- and reference-beam orders in the PS/PDI and optimizing the duty-cycle of the beam-splitting grating. This technique is described by Naulleau et. al., U.S. patent application Ser. No. 09/176,695 filed Oct. 21, 1998. This method which employs conventional diffraction amplitude grating, unfortunately, negates one of the attributes of the original configuration which is that any aberrations imparted by ruling errors in the diffraction grating are removed by virtue of the diffracted-order from the grating being the pinhole-filtered reference-beam. When high quality gratings are used, this problem is less relevant. Current state-of-the-art electron-beam lithography fabricated gratings used in the optimized contrast configuration provide an accuracy up to about $\lambda_{EUV}/200$ without averaging over grating position. On the other hand, tests have demonstrated the reference wave limited accuracy of the PS/PDI to be $\lambda_{EUV}/350$ or better.

SUMMARY OF THE PRESENT INVENTION

The present invention achieves improved reference wave limited accuracy by maintaining the diffracted-order filtering advantage of the original PS/PDI configuration without suffering its poor contrast characteristics. This is attained by using phase diffraction gratings instead of amplitude diffraction gratings. The invention is based in part on the discovery that there are various phase-shifting candidate materials at EUV that have attractive absorption to phase-shifting ratio properties. Various phase-enhanced grating embodiments are employed to achieve a tunable +1 to zero order power ratio.

Accordingly, in one embodiment, the invention is directed to a point diffraction interferometer system defining an optical path that includes:
 a source of electromagnetic energy in the optical path;
 a diffraction phase grating in the optical path for dividing light from the source into a reference beam and a test beam;
 at least one optical element under test in the optical path;
 a mask in the optical path positioned in an image plane; and a detector in the optical path positioned after the mask wherein the mask defines a test-beam window and at least one reference-beam pinhole, and wherein the diffraction phase grating diffracts a zeroth-order diffraction of light to the test-beam window and a first-order diffraction to the reference pinhole.

In another embodiment, the invention is directed to a method of modifying the diffraction beams of a phase-shifting point diffraction interferometer that defines an optical path that includes (i) a source of electromagnetic energy in the optical path, (ii) an optical element under test in the optical path, and (iii) an irradiance detector in the optical path downstream from the optical element under test, the method including the steps of:
 (a) positioning a mask in the image plane of the optical system under test positioned upstream of the irradiance detector wherein the mask defines a test-beam window and at least one reference pinhole;
 (b) positioning a diffraction phase grating in the optical path for dividing the electromagnetic radiation from the source into a test beam and a reference beam;
 (c) aligning the mask so that the test beam passes through the test-beam window and the reference beam passes through the at least one reference pinhole wherein the diffraction phase grating diffracts a zeroth-order diffraction of light at a first power level to the test-beam window and a first-order diffraction at a second power level to the reference-beam pinhole.

BRIEF DESCRIPTION OF THE DRAWING

The present invention may be further understood from the following description in conjunction with the appending drawing. In the drawing:

FIG. 1 is a diagram of a prior art phase-shifting point diffraction interferometer;

FIG. 2A is a diagram of a phase-shifting point diffraction interferometer that can use the gratings of the present invention, where, for consistency with the current implementation, the system is depicted in its equivalent grating in front of the test optic configuration;

FIG. 2B illustrates a mask configuration for the PS/PDI;

FIGS. 3A–3F illustrate phase gratings;

FIG. 4 is a graph of the rms phase error in waves vs. the reference-to-test-beam power ratio;

FIG. 5A is a graph of power efficiency for a binary amplitude grating vs. duty-cycle;

FIG. 5B is a graph of +1 to zero order power ratio for a binary amplitude grating vs. duty-cycle;

FIG. 6A is a graph of power efficiency for a Mo binary $\pi$-phase grating vs. duty-cycle;

FIG. 6B is a graph of +1 to zero order power ratio for a Mo binary $\pi$-phase grating vs. duty-cycle;

FIG. 7A is a graph of power efficiency for a Mo binary grating vs. modulation depth relative to $\pi$;

FIG. 7B is a graph of +1 to zero order power ratio for a Mo binary grating vs. modulation depth relative to $\pi$;

FIG. 8A is a graph of power efficiency for a Mo blazed-phase grating vs. fractional blaze strength;

FIG. 8B is a graph of +1 to zero order power ratio for a Mo blazed-phase grating, vs. fractional blaze strength;

FIG. 9A is a graph of power efficiency for a blazed-phase Mo wave grating vs. number of required etch steps;

FIG. 9B is a graph of +1 to zero order power ratio for a blazed-phase Mo grating vs number of required etch steps;

FIG. 10A is a graph of power efficiency for 3 and 4 etch-step Mo blazed-phase gratings vs. fractional blaze strength; and FIG. 10B is a graph of +1 to zero order power ratio for 3 and 4 etch-step Mo blazed-phase wave gratings vs. fractional blaze strength.

DETAILED DESCRIPTION OF THE PREFERRED EMBODIMENT

FIG. 2A illustrates a phase-shifting point diffraction interferometer 40 of one embodiment of the present invention. The electromagnetic energy source 47 directs a beam 49 onto a pinhole 44 in mask 46 that produces a spatially coherent wave. The source of electromagnetic radiation could also be a laser that is spatially coherent without an input pinhole. The spatially coherent radiation 45 impinges upon a beam splitter 48 that creates replicas of the input beam with a small angular separation. One of these beams is used as the test beam 50 and another as the reference beam 52. The test beam 50 and reference beam 52 pass through the optic under test 54 which is to be evaluated for aberrations. For the invention described here, the beam splitter is an innovative diffraction phase grating, as further described herein, which diffracts a zeroth-order diffraction of light at a first power level to the test beam window 56A and a first-order diffraction at a second power to the reference-beam pinhole 56B.

The test optic 54, which may be a mirror, lens, etc., focuses the test beam 50 and reference beam 52 to the image plane. The beam splitter 48 causes the reference beam 52 and test beam 50 to have different laterally separated foci. Thus, the region of maximal intensity for the test beam 50 is separated from the region of maximal intensity for the reference beam 52 at the image plane where the mask 56 is located. Mask 56 is preferably positioned in the image plane. The test beam 50 passes through the relatively large test-beam window 56A of the mask 56. This test beam is not substantially spatially filtered. The reference beam 52 goes through the reference pinhole 56B of the mask 56. The reference beam is thus filtered at the image plane, and the reference beam 52 after the mask 56 constitutes a high-quality spherical reference wave 53. The test wave 50 will interfere with the reference wave 53 at the detector 58 to generate the interference pattern. The fringe contrast of the interference pattern will depend on the relative strengths of the reference and test beams at the detector. The fringe contrast reaches a maximum when the reference beam matches the test beam in intensity. Various detectors may be employed including, for example, photosensitive film, a CCD array, and a video camera.

The size of the reference pinhole 56B on the mask 56 significantly influences the accuracy of the point diffraction interferometer. The reference pinhole must be smaller than the diffraction-limited focal spot of the optic under test. Thus, the pinhole diameter should approach the wavelength of the radiation. Additionally, a small pinhole ensures that there is sufficient divergence of the reference beam 53. The angle, in radians, of the radiation emitted from the pinhole covers an angle given by the expression $$\alpha = \frac{1.22\lambda}{d}$$

where $\lambda$ is the radiation wavelength, and d is the diameter of the pinhole. The quality of the reference wave is improved by using a small pinhole at the expense of signal amplitude. A translation of the grating beam splitter 48 in the direction normal to the grating rulings produces a controllable phase shift between any two diffractive orders, and is used to implement phase-shifting interferometry. Between two adjacent orders, a translation of one cycle produces a relative phase shift of $2\pi$ radians, or one wave. Since small beam separations are typically used, the grating can be quite coarse, making fractional cycle translations easily achievable by the translation stage 49.

In this PS/PDI system, the test beam 50 corresponds to the zeroth-order diffraction of the grating 48, and the reference beam 52 corresponds to a first-order diffraction of the grating 48. This arrangement, which is referred to as the first-order-reference configuration, allows aberrations in the first-order diffraction induced by the grating to be removed by way of the reference pinhole. Because the grating is positioned after the input spatial filter pinhole 44, any aberrations imparted by the grating will be indistinguishable from those in the test optic. Errors in grating line-placement will manifest themselves as aberrations in the diffracted beam. It may be possible, however, to suppress grating induced errors through measurement averaging used in combination with large grating translations. The diffraction phase grating is typically positioned between the source and the optical system under test or between the optical system under test and the image plane mask.

FIG. 2B is a diagram of a mask 100 for use with the present first-order-reference configuration PS/PDI. The test-beam window 100A is in the center of the mask for receiving the zeroth-order test beam. The reference pinhole 100B is positioned to be at the center of a first-order diffraction of the diffraction phase grating. The test-beam window defines an opening with a width in the direction of beam separation that is about 20 to 100 times the diffraction-limited resolution of the optical system under test and a width in the direction orthogonal to the direction of the beam separation that is at least about 20 times the diffraction-limited resolution of the optical system under test. The test-beam window typically has an area of about 0.04 $\mu m^2$ to 50 $cm^2$. The reference pinhole preferably has a diameter that ranges from about 0.5 to 1 times the diffraction-limited resolution of the optical system under test. Specifically, the reference pinhole typically has a diameter that ranges from about 5 nm to 100 $\mu$m.

The effect of the reference- to test-beam power ratio on the photon noise limited accuracy when using phase-shifting interferometry, can readily be found using a simple method developed by Brophy. (See, C. P. Brophy "Effect of intensity error correlation on the computed phase of phase shifting interferometry", J. Opt. Soc. Am. A., 7, 537–541 (1990).) From the Brophy method, the rms phase error at any given pixel is given by $$\sigma_\phi = \sqrt{\frac{k}{\gamma^2 n_o}}, \qquad \text{Eq. (1)}$$

where k is an algorithm dependent constant ($7/16$ for a typical five-bucket algorithm), $\gamma$ is the fringe contrast, and $n_o$ is the average exposure in photons. The fringe contrast, $\gamma$ is defined as $(I_{max}-I_{min})/(I_{max}+I_{min})$ therefore, two interfering waves having amplitudes A and B respectively, can be shown to produce a fringe pattern of contrast $$\gamma = \frac{2AB}{A^2+B^2}. \qquad \text{Eq. (2)}$$

Defining L as the pinhole filtering induced reference-beam power attenuation factor, C as the reference- to test-beam power ratio, and, without loss of generality, normalizing the equation to a test-beam amplitude of unity, Eq. (2) can be rewritten as $$\gamma = \frac{2\sqrt{CL}}{CL+1}. \qquad \text{Eq. (3)}$$

Substituting Eq. (3) into Eq. (1), the expression for rms phase error becomes:

$$\sigma_\phi = \sqrt{\frac{k}{n_o}} \left(\frac{CL+1}{2\sqrt{CL}}\right). \qquad \text{Eq. (4)}$$

FIG. 4 shows a plot of the rms phase error in waves as a function of the reference- to test-beam power ratio under the following assumptions: L=0.005, $n_o$=20000 (half the photo well depth of a typical EUV CCD), and k=7/16.

In order to maximize the fringe contrast and hence the measurement accuracy, the present invention employs novel diffraction phase gratings which are generally defined as periodic structures in which the phase shift imparted to the incident beam varies as a function of position, whereas, in the ideal case, the attenuation does not.

At EUV wavelengths, this condition is difficult to meet because all materials induce non-negligible attenuation. In a particularly preferred embodiment, the material used for EUV (13.4 nm) phase gratings in terms of its phase-shift-to-attenuation ratio and ease to work with is molybdenum (Mo). At 13.4 nm, Mo has a Delta (the real part of the complex index of refraction) of $7.7328 \times 10^{-2}$ and a Beta (the imaginary part of the index of refraction) of $6.2296 \times 10^{31\ 3}$. From these values, the 1/e attenuation length of Mo is calculated to be 171 nm and the $2\pi$ phase-shift length to be 173 nm.

Diffraction phase gratings are preferably configured as binary-phase gratings or as blazed-phase gratings. FIG. 3A is a cross-sectional view of a binary-phase grating that comprises a series of mesa-like structures 74 that are made from suitable phase shifting material, e.g., Mo, that are formed on substrate 72. The substrate is preferably made of material that has maximum strength and minimum absorption. At EUV, the preferred substrate is typically 100 nm of silicon nitride. The width of each structure 74 is W and distance between the front sides of successive structures is T. The height of the structure can also be varied to tune the +1 to zero order power ratio. In this embodiment, the height of each mesa-like structure 74 that is made of Mo is 86.5 nm, which is equal to the $\pi$ phase shift thickness for EUV radiation at 13.4 nm. Since the duty cycle is defined as (W/T×100) %, this embodiment has a duty cycle of 50% when T=½ W.

Similarly, FIG. 3B illustrates a binary-phase grating wherein each mesa-like structure 74 has the same W and $\pi$-phase shift thickness as those in FIG. 3A but T is larger so that the duty to cycle is less than 50%.

Finally, FIG. 3C illustrates a binary-phase grating wherein the mesa-like structures 74 have the same W and T as those in FIG. 3A but the height M of the structures are less than that of the structures of FIG. 3A. The relative modulation depth is defined as M/$\pi$. This binary-phase grating therefore has a duty cycle equal to 50% but exhibits a phase shift of less than $\pi$.

FIG. 3D, 3E, and 3F illustrate preferred blazed-phase gratings. In FIGS. 3D and 3E, the gratings that comprise right triangular Mo structures 84 that are formed on substrate 82. The peak-to-peak distance is T and the height of the triangular structure is M. The embodiment depicted in FIG. 3D has a blaze strength equal to 1 since M is equal to the $2\pi$-phase shift thickness of Mo. In contrast, the grating depicted in FIG. 3E has M that is less than that of the $2\pi$-phase shift thickness so its blaze strength is less than 1. The blaze strength (or fractional blaze strength) is defined as M/$2\pi$. FIG. 3F illustrates a "quantized" blaze grating that is easier to fabricate than those of FIGS. 3D and 3E. As is apparent, each triangular structure is represented by a series of steps or levels 111, 112, 113 and 114. The number of quantization levels is equal to $2^N$ where N is the minimum number of etch steps required in the fabrication process and typically ranges from 2 to 8. The blaze strength will depend on the total height M of the levels.

The use of phase diffraction gratings will enhance the performance of the PS/PDI. This holds true whether binary or blazed gratings are used. If throughput is a concern, blazed gratings are preferred. Even using only 3 etch steps in the fabrication process to produce 8 phase level yields significant throughput improvement (about a factor of 2) over the binary phase case.

Simulations were conducted to demonstrate that the PS/PDI employing the inventive diffraction phase gratings will produce good interferometric fringe contrast to yield accurate wavefront measurements. As a comparison, simulations were also conducted using a conventional binary amplitude diffraction grating.

Table 1 shows the usable order power efficiency and reference- to test-beam power ratio for various conventional grating configurations including the idealized pure phase grating case.

The usable power efficiency is defined as the fraction of the input power appearing in the two beams used as the test and reference beams. The effect of grating substrate attenuation is ignored because it is identical for all cases considered. It is noted, however, that the transmission at 13.4 nm for a 100-nm thick silicon-nitride substrate is 43%. The reference- to test-beam power ratio that is calculated is based on measurements immediately after the grating; this criterion indicates the limits of how much pinhole-filtering induced reference-beam attenuation can be tolerated before the interferometric accuracy becomes limited by low contrast effects (photon noise). Conversely, the smaller the reference pinhole is made the better the reference-wave accuracy becomes at the cost of higher attenuation. Clearly, the PS/PDI should be designed so that the post grating reference- to test-beam power ratio is preferably much greater than unity.

TABLE 1

| | Grating configurations | Usable order efficiency | Referenee to test beam power ratio |
|---|---|---|---|
| 1 | 50% opaque, amplitude grating, 50% duty-cycle | 0.35 | 0.40 |
| 2 | Pure $\pi$-phase grating, 50% duty-cycle | 0.41 | 4 |
| 3 | Pure $\pi$-phase grating, 50% duty-cycle, +1 and −1 orders | 0.81* | 1.00* |
| 4 | Mo $\pi$-phase grating, 50% duty-cycle | 0.33 | 26.05 |
| 5 | Mo $\pi$-phase grating, 50% duty-cycle, +1 and −1 orders | 0.64* | 1.00* |
| 6 | Mo blazed-phase grating, $2\pi$ full blaze height | 0.62 | 139.45 |

*Here we consider the use of the +1 and −1 orders instead of the +1 and zero orders for the reference and test beams respectively. This configuration may be beneficial to laser-plasma shearing interferometry.

The first entry in Table 1 is the conventional PS/PDI configuration of a 50% duty-cycle binary amplitude grating with the first order being used as the reference beam and the zero order being used as the test beam. As stated above, from the point of view of grating line-placement error, this is the preferred order orientation because post-grating pinhole filtering of the reference beam can remove the grating-error-induced aberrations imparted to the beam diffracted by the grating. The efficiency in this case is 35% whereas the reference- to test-beam power ratio is only 0.40.

The second entry in Table 1 considers the idealized pure phase binary grating case with $\pi$-phase rulings. Although not realizable at EUV due to the non-negligible attenuation imparted by all phase shifting materials, this case is included for comparison. Again considering a 50% duty-cycle grating, the efficiency increases to 41% and the power ratio increases to infinity. Even if realizable, this case would not be practical due to the complete elimination of the zero order. It does demonstrate, however, that arbitrarily large reference- to test-beam ratios could be possible in a configuration similar to this.

The third entry shows that another interesting aspect of the 50% duty-cycle pure phase grating case is that using the +1 and −1 orders instead of the +1 and zero order provides an efficiency of 81% although the power ratio is only unity. Again, even if realizable, this configuration would not be very attractive to the PS/PDI due to the low power ratio; however, it is an ideal candidate for incoherent-source shearing interferometry [See, J. E. Bjorkholm, A. A. MacDowell, O. R. Wood II, Z. Tan, B. LaFontaine, and D. M. Tennant, "Phase measuring interferometry using extreme ultraviolet radiation," J. Vac. Sci. & Technol. B 13, 2919–2922 (1995)] where total efficiency is very important and a power ratio of unity is in fact desired.

The fourth entry considers a 50% duty-cycle Mo $\pi$-phase square-wave grating at a wavelength of 13.4 nm. The Mo induced $\pi$-phase modulation is assumed to occur with no Mo induced bulk phase modulation. That is to say that there is no Mo present in the areas of zero phase shift. This is important from the efficiency point of view because Mo is attenuating at 13.4 nm. Here the efficiency of 33% is almost identical to the amplitude grating case whereas the power ratio of 26 is 65 times larger than the amplitude grating case.

In the shearing configuration (using the +1 and −1 orders instead of the +1 and zero orders) the Mo grating has an efficiency of 64% and a power ratio of unity. The sixth entry in Table 1 considers a blazed-phase Mo grating with the full blaze height equal to 2 $\pi$. Again the Mo thickness is assumed to go to zero where the phase shift is zero. Here the grating efficiency is 62% and the power ratio is approximately 139. From the perspective of high accuracy PS/PDI, this configuration provides the best results of those considered in Table 1.

In Table 1, only 50% duty-cycle cases were considered, however, it is possible to modify the values in Table 1 by changing the grating duty-cycle. FIGS. 5A and 5B show the results for power efficiency and +1 and zero order power ratio, respectively, for the amplitude grating as a function of duty-cycle, where a duty-cycle of 100% is fully opaque. The best achievable power ratio is unity, however, the efficiency approaches zero as the power ratio approaches unity. Using an amplitude grating in the +1 order reference configuration is not well suited to the power balancing required with the PS/PDI. There is little advantage to modifying the duty-cycle in this case. This problem can be overcome by reversing the test and reference beams and reducing the duty-cycle instead of increasing it; however, in this configuration we loose the benefits of filtering the diffracted beam. Using current state of the art fabrication techniques, this method has been shown to be limited to an accuracy of about $\lambda_{EUV}/200$ without averaging over grating position.

Next, the performance of the Mo $\pi$-phase binary grating as a function of duty-cycle was examined. FIGS. 6A and 6B show the power efficiency and power ratio, respectively, versus the duty-cycle that is varied from 48% to 60%. The power efficiency monotonically decreases with increasing duty-cycle, dropping to a value of about 29% at a duty-cycle of 60%. This drop in efficiency with increasing duty-cycle is due to the absorption of Mo. The power ratio, on the other hand, shows the interesting behavior of varying by two orders of magnitude across the 48% to 60% duty-cycle range with the peak occurring at a duty-cycle of about 56%. From this data, it is apparent that the power ratio can be readily tuned to a specific experimental situation by choosing the proper grating thereby balancing the reference-beam losses incurred in the PS/PDI.

The performance of the Mo binary grating as a function of modulation depth was also investigated. Because Mo is not a pure phase-shifting material at EUV, one might expect the diffraction peak to occur at a modulation slightly different than $\pi$. FIGS. 7A and 7B show the power efficiency and power ratio as the modulation depth is varied from 0.5 $\pi$ to 1.5 $\pi$, respectively. The power ratio peak occurs at approximately 0.99 $\pi$ (86 nm for Mo at $\lambda$=13.4 nm).

The performance of the blazed-phase Mo grating as a function of blaze strength was also examined. The fractional blaze strength is defined as the maximum blaze height divided by 2 $\pi$. FIGS. 8A and 8B are the power efficiency and +1 to zero order power ratio, respectively, for a Mo blazed-phase grating versus the fractional blaze strength. The data demonstrate that varying the fractional blaze strength from 0.7 to 1 has relatively little effect on the power efficiency but has much effect on the power ratio. In this case the power ratio can be varied from about 10 to 150 while keeping the efficiency above 60%. Although the achievable power ratios are significantly smaller than for the Mo binary grating case, the increased efficiency makes the blazed Mo grating a very attractive choice for the PS/PDI.

Although the blazed-phase grating has been shown to be an excellent candidate for the PS/PDI, a continuous profile blazed-phase grating is extremely difficult to fabricate. What is more feasible to fabricate, however, is a discrete profile blazed-phase grating. Therefore, the effect of quantization of the blaze profile was considered. FIGS. 9A and 9B shows the power efficiency and the power ratio, respectively, for a blazed-phase Mo grating with a fractional blaze strength of unity as a function of the number of required etch steps. The number of achievable discrete levels in the blaze can be shown to be $2^N$ where N is the number of etch steps. It is evident that there is little benefit to going beyond four steps and, in fact, most of the gains are achieved within three steps.

Finally, calculations performed for FIGS. 8A and 8B were repeated to generate similar plots which are shown in FIGS. 10A and 10B for quantized Mo blazed-phase gratings. The plots show results for 3 and 4 etch steps, yielding 8 and 16 levels, respectively. Results very similar to the non-quantized profile curves shown in FIGS. 6A and 6B are obtained.

Although only preferred embodiments of the invention are specifically disclosed and described above, it will be appreciated that many modifications and variations of the present invention are possible in light of the above teachings and within the purview of the appended claims without departing from the spirit and intended scope of the invention.

What is claimed is:

1. A point diffraction interferometer system defining an optical path comprising:

a source of electromagnetic energy in the optical path;

a transmission-type diffraction phase grating in the optical path for dividing light from the source into a reference beam and a test beam;

at least one optical element under test in the optical path;

a mask in the optical path positioned in the image plane of the optical element under test; and a detector in the optical path positioned after the mask wherein the mask defines a test-beam window and at least one reference-beam pinhole, and wherein the transmission-type diffraction phase grating diffracts a zeroth-order diffraction of light to the test-beam window and a first-order diffraction to the reference pinhole.

2. The point diffraction interferometer system of claim 1 wherein the diffraction phase grating is positioned between the source and the optical system under test, or between the optical system under test and the image-plane mask.

3. The point diffraction interferometer system of claim 1 wherein the diffraction phase grating comprises molybdenum and the source of electromagnetic energy generates extreme ultra-violet radiation.

4. The point diffraction interferometer system of claim 3 wherein the diffraction phase grating has π-phase rulings with a 50% duty cycle.

5. The point diffraction interferometer system of claim 1 wherein the diffraction phase grating has a duty cycle such that the power ratio of the first order diffraction to the zeroth order balances beam losses incurred in the point diffraction interferometer system.

6. The point diffraction interferometer system of claim 1 wherein the diffraction phase grating has a duty cycle that ranges from about 48% to 60%.

7. The point diffraction interferometer system of claim 6 wherein the duty cycle is about 56%.

8. The point diffraction interferometer system of claim 1 wherein the diffraction phase grating has a blazed-phase configuration.

9. The point diffraction interferometer system of claim 8 wherein the diffraction phase grating comprises molybdenum and the blazed-phase configuration has a 2 π full blaze height and the source of electromagnetic energy generates extreme ultra-violet radiation.

10. The point diffraction interferometer system of claim 8 wherein the diffraction phase configuration has a fractional blaze strength that ranges from about 0.7 to 1.

11. The point diffraction interferometer system of claim 8 wherein the phase grating is a discrete profile blaze-grating.

12. The point diffraction interferometer system of claim 11 wherein the phase grating has 8 or 16 discrete levels.

13. The point diffraction interferometer system of claim 8 wherein the phase grating has a fractional blaze strength such that the power ratio of the first order diffraction to the zeroth order balances reference beam loses incurred in the point diffraction interferometer system.

14. A method of modifying the diffraction beams of a phase-shifting point diffraction interferometer that defines an optical path that includes (i) a source of electromagnetic energy in the optical path, (ii) an optical element under test in the iptical path, and (iii) an irradiance detector in the optical path downstream from the optical element under test, comprising the steps of:

(a) positioning a mask in the image plane of the optical system under test positioned upstream of the irradiance detector wherein the make defines a test-beam window and at least one reference pinhole;

(b) positioning a transmission-type diffraction phase grating in the optical path for dividing the electromagnetic radiation from the source into a test beam and a reference beam;

(c) aligning the mask so that the test beam passes through the test-beam window and the reference beam passes through the at least one reference pinhole wherein the diffraction phase grating diffracts a zeroth-order diffraction of light at a first power level to the test-beam window and a first-order diffraction at a second power level to the reference beam pinhole.

15. The method of claim 14 wherein the diffraction phase grating is selected to yield a desired ratio of the first power level to second power level.

16. The method of claim 14 wherein the diffraction phase grating is positioned between the source and the optical system under test, or between the optical system under test and the image-plane mask.

17. The method of claim 14 wherein the diffraction phase grating comprises molybdenum and the source of electromagnetic energy generates extreme ultra-violet radiation.

18. The method of claim 17 wherein the diffraction phase grating has π-phase rulings with a 50% duty cycle.

19. The method of claim 14 wherein the diffraction phase grating has a duty cycle such that the power ratio of the first order diffraction to the zeroth order balances beam losses incurred in the point diffraction interferometer system.

20. The method of claim 14 wherein the diffraction phase grating has a duty cycle that ranges from about 48% to 60%.

21. The method of claim 20 wherein duty cycle is about 56%.

22. The method of claim 14 wherein the diffraction phase grating has a blazed-phase configuration.

23. The method of claim 22 wherein the diffraction phase grating comprises molybdenum and the blazed-phase configuration has a 2 π full blaze height and the source of electromagnetic energy generates extreme ultra-violet radiation.

24. The method of claim 22 wherein the diffraction phase configuration has a fractional blaze strength that ranges from about 0.7 to 1.

25. The method of claim 22 wherein the phase grating is a discrete profile blaze-grating.

26. The method of claim 25 wherein the phase grating has 8 or 16 discrete levels.

27. The method of claim 22 wherein the phase grating has a fractional blaze strength such that the power ratio of the first order diffraction to the zeroth order balances reference-beam loses incurred in the point diffraction interferometer system.

* * * * *